US007952982B2

(12) United States Patent
Chen et al.

(10) Patent No.: US 7,952,982 B2
(45) Date of Patent: May 31, 2011

(54) DATA STORAGE MEDIUM, DATA STORAGE DEVICE CONTAINING SAME, AND METHOD OF MANUFACTURING DATA STORAGE DEVICE CONTAINING SAME

(75) Inventors: Robert Chen, San Francisco, CA (US); Qing Ma, San Jose, CA (US); Valluri Rao, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 12/215,992

(22) Filed: Jun. 30, 2008

(65) Prior Publication Data
US 2009/0323506 A1 Dec. 31, 2009

(51) Int. Cl.
*G11B 9/00* (2006.01)
(52) U.S. Cl. ........................................................ 369/126
(58) Field of Classification Search .................... None
See application file for complete search history.

(56) References Cited

U.S. PATENT DOCUMENTS

| 4,577,506 A * | 3/1986 | Poole et al. ..................... 73/633 |
| 6,475,889 B1 * | 11/2002 | Ring .............................. 438/571 |
| 6,759,309 B2 * | 7/2004 | Gross ............................. 438/455 |
| 7,115,520 B2 * | 10/2006 | Johnson et al. ............... 438/706 |
| 7,679,272 B2 * | 3/2010 | Okamura et al. ............. 310/358 |
| 7,706,103 B2 * | 4/2010 | Seigler ..................... 360/125.17 |
| 2006/0066176 A1 * | 3/2006 | Nanataki et al. ............. 310/311 |
| 2008/0316904 A1 * | 12/2008 | Duerig et al. ................. 369/126 |

* cited by examiner

*Primary Examiner* — Joseph H Feild
*Assistant Examiner* — Parul Gupta
(74) *Attorney, Agent, or Firm* — Kenneth A. Nelson

(57) ABSTRACT

A data storage medium includes a piezoelectric film (101) having a surface (111) including a halogen. In one embodiment, the halogen exists in an atomic concentration of at least approximately 10 percent. The result is a hydrophobic surface conducive to long-lasting scanning probe tips, low contamination, and stable surface charge. A data storage device incorporating the data storage medium includes an enclosure (205) containing the data storage medium and an adjacent scanning probe (230) wherein the enclosure has a relative humidity of at least approximately 40 percent and at least a portion of the scanning probe is coated with a layer of water.

6 Claims, 4 Drawing Sheets

DATA STORAGE MEDIUM, DATA STORAGE DEVICE CONTAINING SAME, AND METHOD OF MANUFACTURING DATA STORAGE DEVICE CONTAINING SAME

FIELD OF THE INVENTION

The disclosed embodiments of the invention relate generally to data storage devices, and relate more particularly to scanning probes for such storage devices.

BACKGROUND OF THE INVENTION

Ferroelectric films are a promising candidate for scanning probe-based memory storage devices. One fundamental hurdle inherent to this technology is probe wear. Over the lifetime of the memory storage device the probes are expected to scan at high speeds across the surface of the storage medium a total distance of up to 10 kilometers. Throughout this time the probes must maintain a minimum diameter, since the probe tip diameter directly determines the size of the domains that are written. For high density storage, this diameter must be less than 20 nanometers (nm) for early products and will need to be further scaled down for each subsequent technology generation. However, early tests have shown that the probe tips lose their sharpness and degrade significantly under conditions of high speed scanning over long distances. Water vapor is known to act as a lubricant and does indeed reduce tip wear; at 80 percent humidity for example, there is a 50 percent reduction in tip wear versus a dry environment. However, the maximum humidity that can be used is less than 40 percent due to the fact that water condenses on the tip at higher humidities. Such condensation significantly enlarges the effective tip diameter, resulting in larger bits being written.

BRIEF DESCRIPTION OF THE DRAWINGS

The disclosed embodiments will be better understood from a reading of the following detailed description, taken in conjunction with the accompanying figures in the drawings in which.

Figure 1:
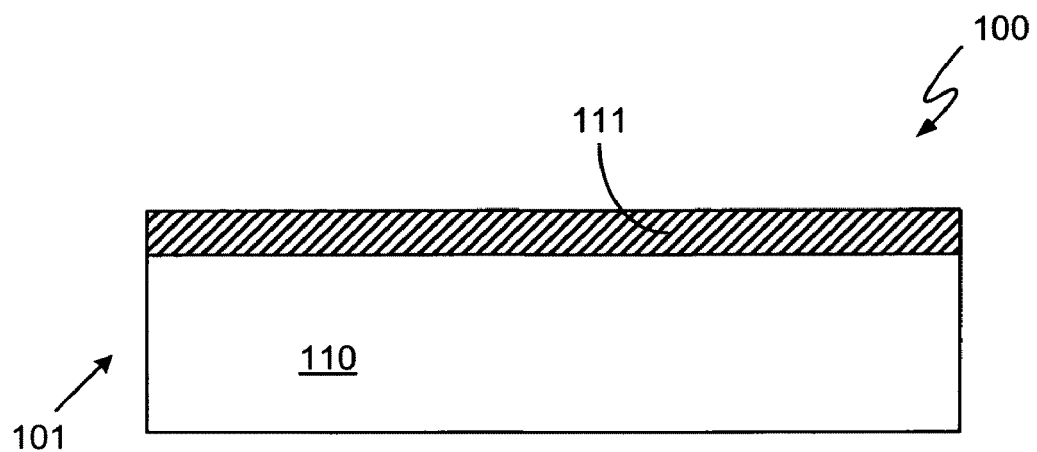
FIG. 1 is a side elevational view of a data storage medium according to an embodiment of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, a data storage medium comprises a piezoelectric film having a surface comprising a halogen. In a particular embodiment, the halogen exists in an atomic concentration of at least approximately 10 percent. Lesser percentages (i.e., lower concentrations) may also be effective and may therefore be used in other embodiments. The result is a highly hydrophobic surface conducive to long-lasting scanning probe tips, low contamination, and stable surface charge. A data storage device incorporating the data storage medium includes an enclosure containing the data storage medium and an adjacent scanning probe. The enclosure has a relative humidity of at least approximately 40 percent. At least a portion of the scanning probe is coated with a layer of water.

Embodiments of the invention enable the use of high relative humidity up to or even exceeding 80 percent, resulting in a reduction in probe tip wear of at least 50 percent. Furthermore, embodiments of the invention reduce carbonaceous contamination by repelling small dust particles and improve read/write performance by stabilizing surface charge. Regarding the contamination reduction, dust particles are capable of damaging scanning probe tips and further capable of preventing proper operation of the data storage device by physically blocking access to the data storage medium. Regarding the stabilization of surface charge, a source of instability in existing data storage systems may be the need to rely on ions from the atmosphere drifting at random to land on the surface and provide the surface charge necessary to stabilize the bit being written. Embodiments of the invention eliminate the need to rely on these random surface effects by providing a very stable charge source bonded directly to the surface of the data storage medium.

Referring now to the drawings, FIG. 1 is a side elevational view of a data storage medium 100 according to an embodiment of the invention. As illustrated in FIG. 1, data storage medium 100 comprises a piezoelectric film 101 having a body 110 and a chemically modified surface 111. Surface 111 comprises a halogen. In one embodiment, this halogen exists in an atomic concentration of at least approximately 10 percent.

In one embodiment, the halogen is fluorine. In the same or another embodiment, the fluorine or other halogen atoms form a monolayer or a submonolayer at surface 111 of piezoelectric film 101. In other words, surface 111 consists of the monolayer or submonolayer of halogen atoms where the halogen atoms replace oxygen (or another element) in the chemical structure of piezoelectric film 101. Advantageously, halogenation does not roughen surface 111 or introduce height variation. The atomic concentration of fluorine, and perhaps of other halogens, can be made to be as high as 22 percent or more, but over time the fluorine tends to desorb and stabilize at approximately 10-12 percent.

As used herein, "monolayer" means a blanket layer of closely-packed atoms (or other particles, as dictated by the context) that has a thickness of one atom (or other particle). The term "submonolayer," as used herein, means a layer of atoms (or other particles) having a thickness of one atom (or other particle) in which, because of holes in the underlying piezoelectric film (or other underlying material), the particles may not be closely-packed because the particles that make up the submonolayer cannot form bonds at the hole locations. The term "submonolayer" may also mean a layer of atoms (or other particles) having a thickness of one atom (or other particle) that is not fully continuous due to lack of enough atoms (or other particles) to fully saturate the surface.

In one embodiment, piezoelectric film 101 comprises lead zirconium titanate (PZT). In other embodiments, piezoelectric film 101 can comprise barium titanate, lead titanate, lanthanum titanate, lead scandium tantalate, barium strontium titanate, lead lanthanum zirconate titanate, or the like. In certain embodiments, PZT is preferred because it exhibits the highest polarization levels under an applied bias. In one embodiment, piezoelectric film 101 can be a thin film grown directly on a substrate using metal-organic chemical vapor deposition (MOCVD) or a similar technique.

The halogenated surface 111 is highly hydrophobic such that it does not permit water to condense and form a concave meniscus. Thus, even at humidity as high as 80 percent or more, the effective diameter of a probe scanning across surface 111 remains unaffected, thus allowing good read/write performance under humidity conditions where such was previously impossible. Also, as previously mentioned, halogenated surface 111 repels contaminant particles and prevents them from being adsorbed. This is due, at least in part, to the fact that many contaminants are electrically charged and are hydrophilic so that they are repelled by hydrophobic surface 111.

Figure 2:
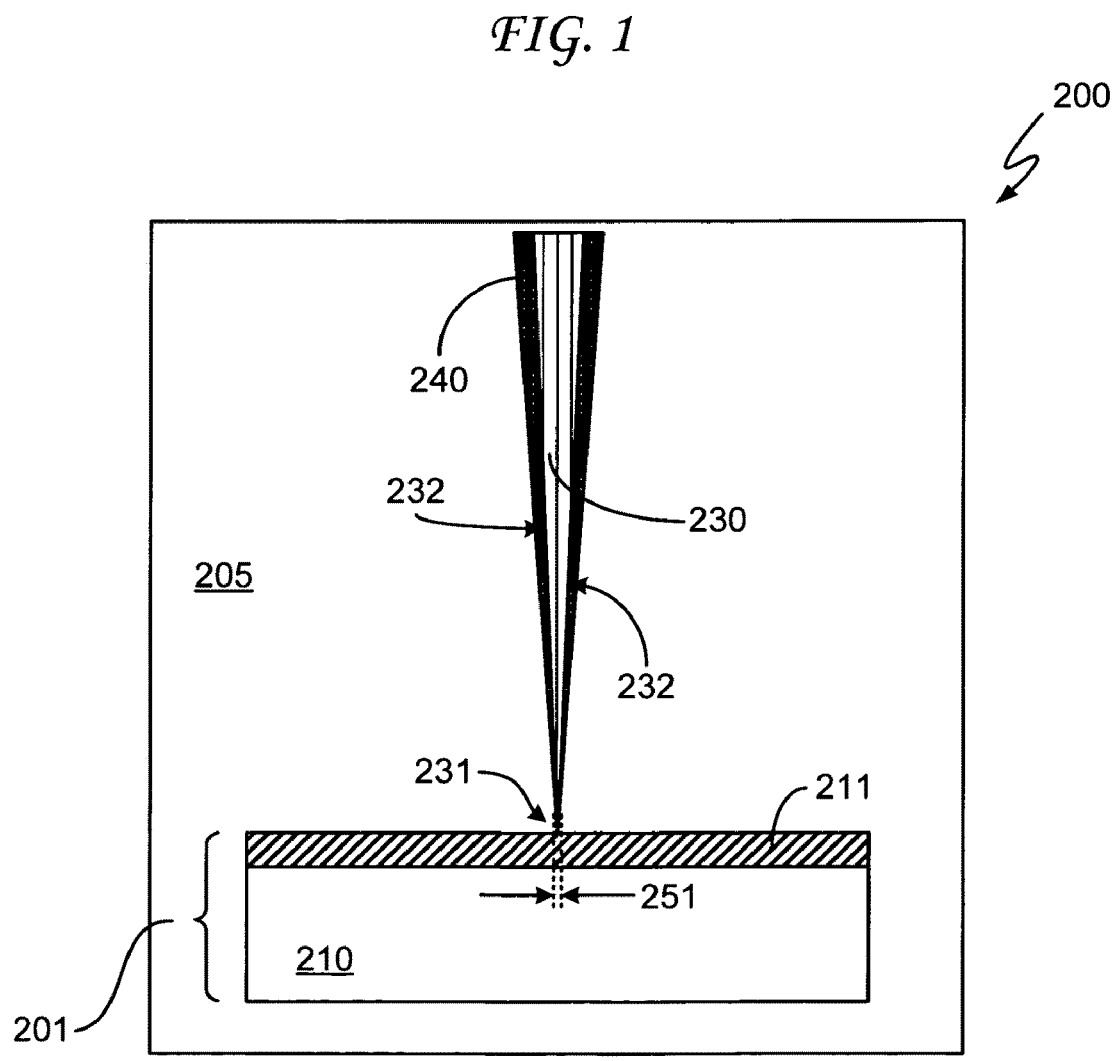
FIG. 2 is a side elevational view of a data storage device according to an embodiment of the invention.

FIG. 2 is a side elevational view of a data storage device 200 according to an embodiment of the invention. As illustrated in FIG. 2, data storage device 200 comprises an enclosure 205 containing a data storage medium 201 and a scanning probe 230 having a probe tip 231. Data storage medium 201 comprises a body 210 with a surface 211 that has an atomic concentration of a halogen, and can be similar to data storage medium 100 that is shown in FIG. 1. (Body 210 and surface 211 can be similar to, respectively, body 110 and surface 111, both of which are shown in FIG. 1.) In one embodiment, the atomic concentration of the halogen is at least approximately 10 percent.

Enclosure 205 has a relative humidity of at least approximately 40 percent, and in some embodiments as high as 80 percent or more. Accordingly, at least a portion of scanning probe 230 is coated with a layer of water 240. This layer of water 240 reduces wear on probe tip 231, thus prolonging the useful life of scanning probe 230 as described above.

Referring still to FIG. 2, scanning probe 230 comprises sidewalls 232 that taper toward and terminate at probe tip 231. Sidewalls 232 may be straight, as in the illustrated embodiment, or they may flex inward or outward or have some other configuration. As an example, and as illustrated, layer of water 240 covers probe tip 231 and extends along sidewalls 232. In one embodiment, scanning probe 230 has an effective diameter 251 of less than 20 nm.

Figure 3:
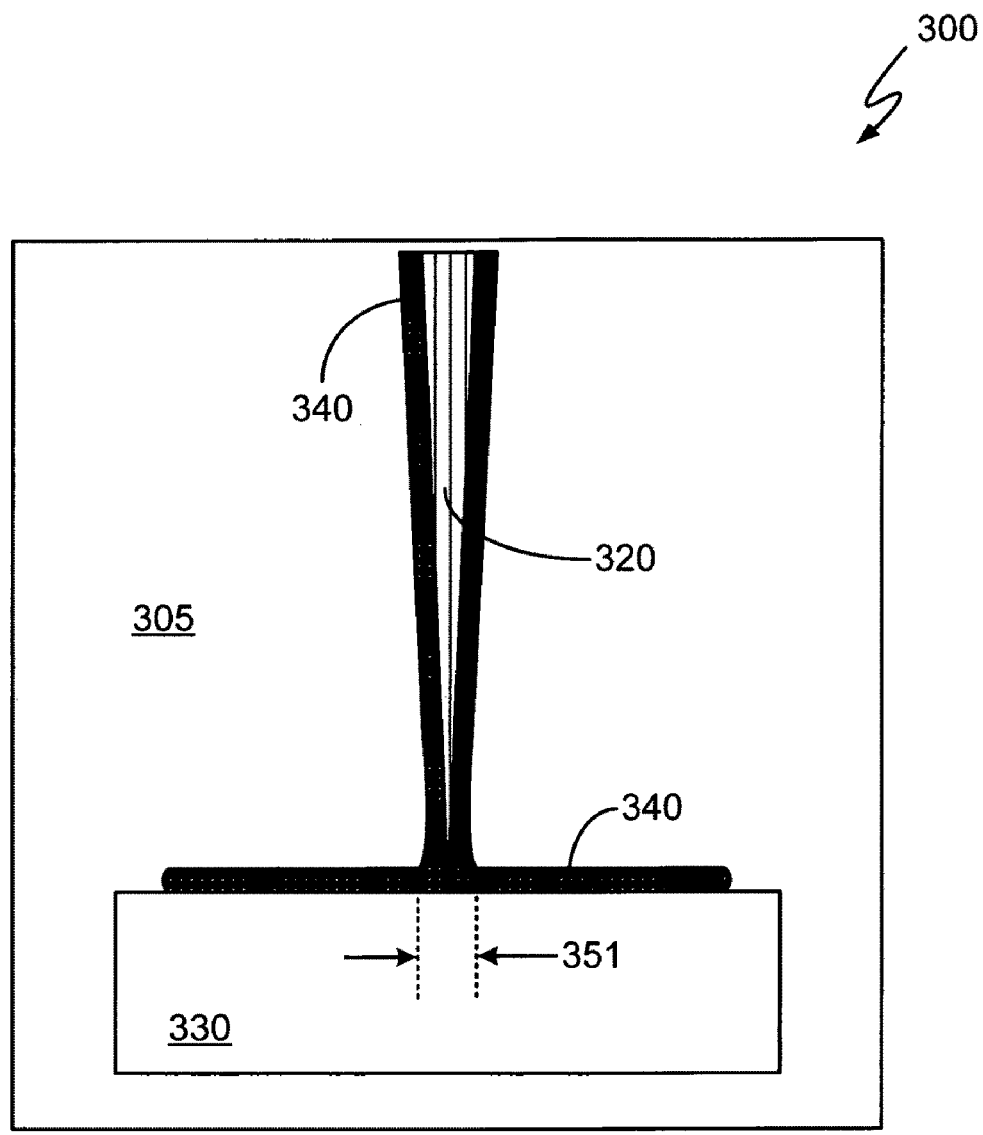
FIG. 3 is a side elevational view (offered for comparison purposes) of a prior art data storage device.

As discussed above, the presence of halogenated surface 211 allows effective diameter 251 of scanning probe 230 to be of the given size despite a relative humidity of up to 80 percent or more. For comparison purposes, FIG. 3 depicts a prior art data storage device 300 comprising an enclosure 305, a scanning probe 320, and a data storage medium 330 that is not halogenated as described herein. As an example, data storage medium 330 can be similar to (chemically unmodified (e.g., non-halogenated)) body 110 of piezoelectric film 101. Given relative humidity levels inside enclosure 305 similar to those described for data storage device 200 of FIG. 2, water condensation 340 at the surface of data storage medium 330 yields an effective diameter 351 for scanning probe 320 that is significantly larger than effective diameter 251 of scanning probe 230. Without the benefit of halogenation, higher humidity levels in data storage device 300 lead to thicker water condensation layers on data storage medium 330 which in turn lead to larger effective diameters for scanning probe 320.

Figure 4:
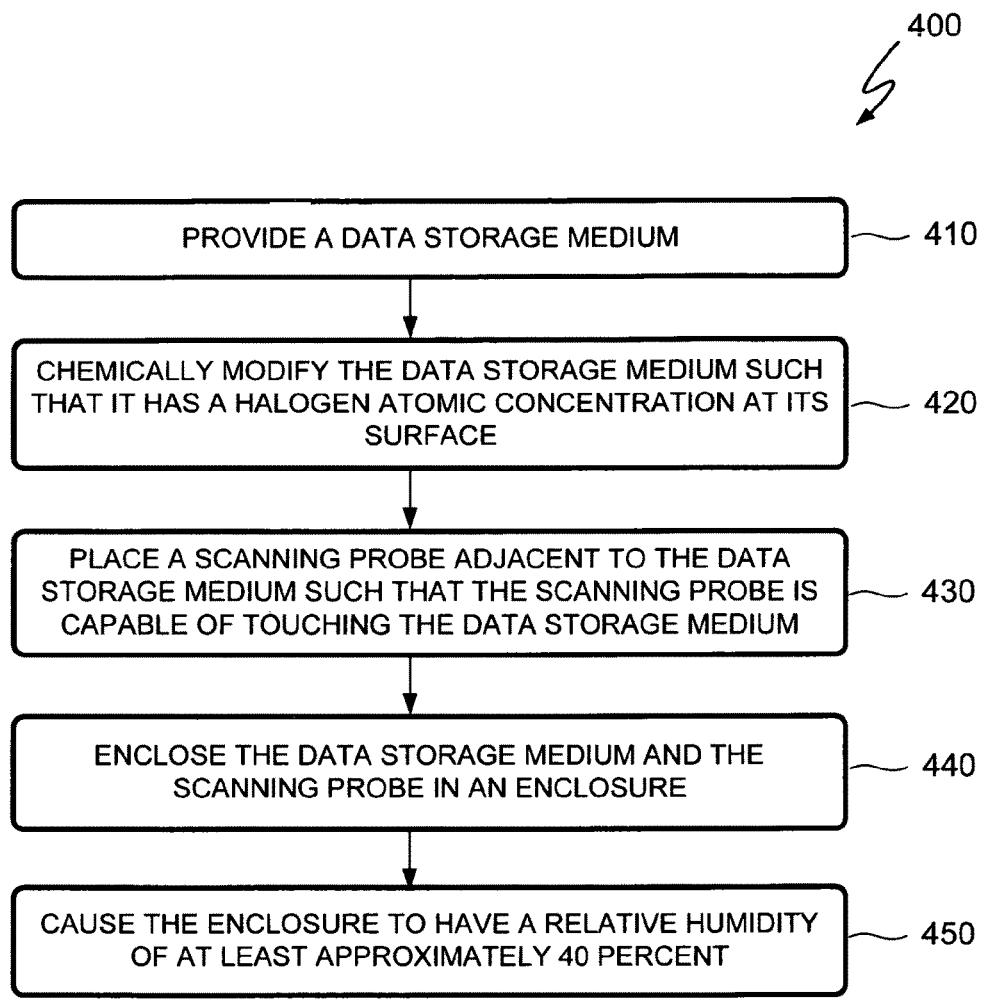
FIG. 4 is a flowchart illustrating a method of manufacturing a data storage device according to an embodiment of the invention.

FIG. 4 is a flowchart illustrating a method 400 of manufacturing a data storage device according to an embodiment of the invention. As an example, method 400 may result in the formation of a data storage device that is similar to data storage device 200 that is shown in FIG. 2.

A step 410 of method 400 is to provide a data storage medium. As an example, the data storage medium can be similar to body 110 of piezoelectric film 101 that is shown in FIG. 1.

A step 420 of method 400 is to chemically modify the data storage medium such that it has a halogen atomic concentration at its surface. As an example, following the performance of step 420 the data storage medium can be similar to data storage medium 100 that is shown in FIG. 1. In one embodiment, the halogen atomic concentration is at least approximately 10 percent.

In one embodiment, step 420 comprises fluorinating the data storage medium. In a particular embodiment, step 420 comprises fluorinating the data storage medium by exposing the data storage medium to a plasma comprising sulfur hexafluoride ($SF_6$). In other embodiments, the plasma could comprise $C_4F_6$, $C_5F_8$, or the like. The use of $SF_6$ is advantageous, at least for certain embodiments, because it is a good etchant for silicon, is fairly reactive so it fluorinates very well, and is inexpensive, non-toxic, and very controllable because it doesn't react unless exposed to a radio-frequency (RF) source. Additionally, $SF_6$ is much cleaner than other substances because it does not create carbon-based polymers as a by-product. Elaborating on the latter point, carbon contamination can be a troublesome issue because single carbon molecules (even from human breath, for example, but certainly from carbon-containing byproducts of the fluorination process, if such byproducts are present) can stick to the data storage medium surface and degrade the read-write performance of the data storage device.

As an example, the data storage medium may be exposed to a plasma comprising $SF_6$ by placing the data storage medium in a plasma chamber, introducing an $SF_6$ gas into the plasma chamber, and exciting the $SF_6$ gas using an RF power source. As an example, the plasma chamber can be similar to a plasma chamber 500 that is shown in FIG. 5.

Figure 5:
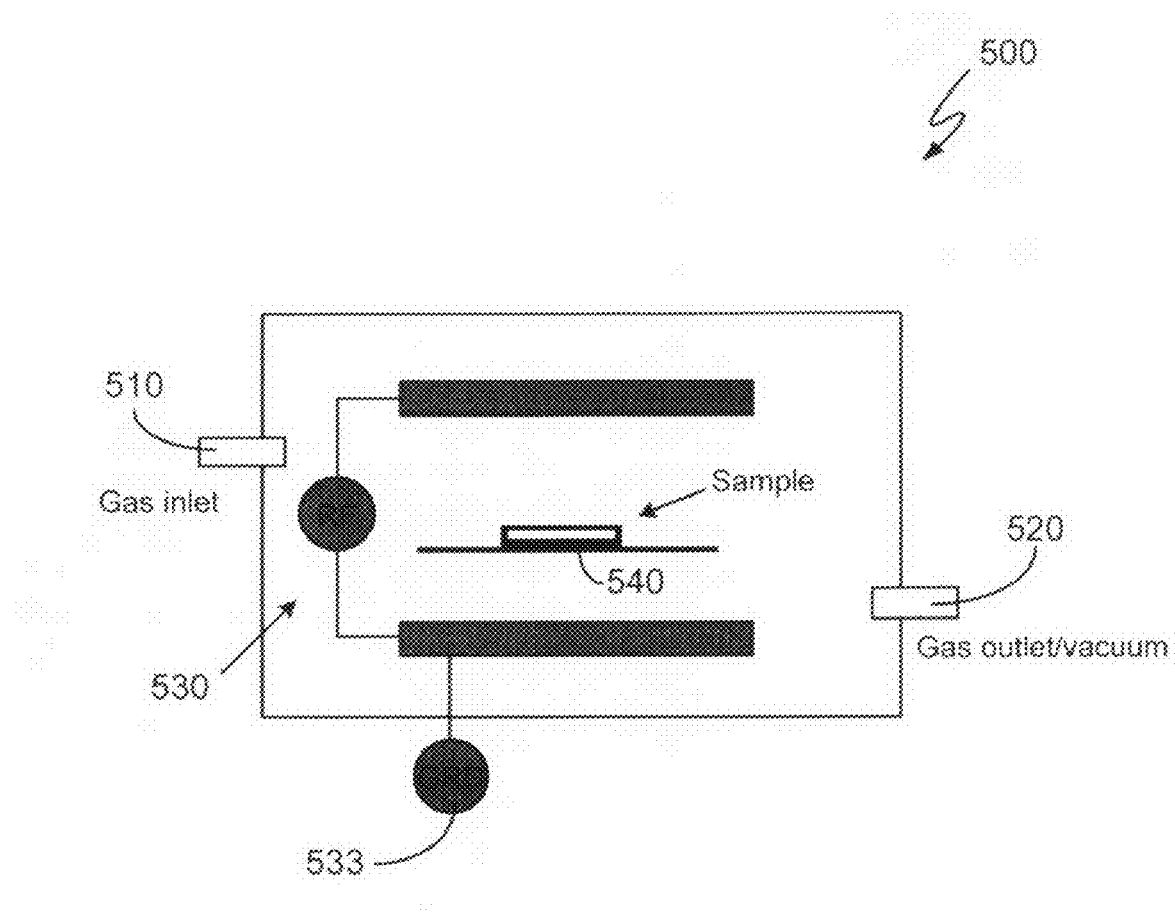
FIG. 5 is a schematic representation of a plasma chamber that may be used to fluorinate a data storage medium according to an embodiment of the invention.

FIG. 5 is a schematic representation of plasma chamber 500 that may be used to fluorinate a data storage medium according to an embodiment of the invention. The same or a similar plasma chamber may be used, under conditions slightly different from those for fluorination to be described here, to perform on the data storage medium alternative halogenation procedures (chlorination, etc.).

As illustrated in FIG. 5, plasma chamber 500 comprises a gas inlet 510, a gas outlet/vacuum 520, and an RF power source 530. Power source 530 is electrically connected to ground 533. Plasma chamber 500 contains a sample 540. As an example, prior to being fluorinated sample 540 can be similar to body 110 (see FIG. 1) of data storage medium 100. After fluorination, sample 540 can be similar to data storage medium 100, including body 110 and surface 111. As another example, $SF_6$ could be admitted into plasma chamber 500 through gas inlet 510 and excited into a plasma by RF power source 530. In various embodiments the $SF_6$ exposure can last between approximately ten seconds to as long as ten minutes or more. In a particular embodiment the exposure lasts for approximately three minutes.

A step 430 of method 400 is to place a scanning probe adjacent to the data storage medium such that the scanning probe is capable of touching the data storage medium. As an example, the scanning probe can be similar to scanning probe 230 that is shown in FIG. 2. Accordingly, in one embodiment the scanning probe has an effective diameter of less than 20 nanometers.

A step 440 of method 400 is to enclose the data storage medium and the scanning probe in an enclosure. As an example, the enclosure can be similar to enclosure 205 that is shown in FIG. 2.

A step 450 of method 400 is to cause the enclosure to have a relative humidity of at least approximately 40 percent. In one embodiment, step 450 comprises pre-loading water vapor into a nitrogen carrier gas flowing into a chamber used to seal the data storage device. As an example, the water vapor can be generated by a bubbler, a humidifier, or the like according to techniques that are known in the art.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the data storage device and related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of manufacturing a data storage device, the method comprising:
   providing a data storage medium;
   chemically modifying the data storage medium such that it has a halogen atomic concentration at its surface;
   placing a scanning probe adjacent to the data storage medium such that the scanning probe is capable of touching the data storage medium;
   enclosing the data storage medium and the scanning probe in an enclosure; and
   causing the enclosure to have a relative humidity of at least approximately 40 percent,
   wherein:
      chemically modifying the data storage medium comprises fluorinating the data storage medium by exposing the data storage medium to a plasma comprising sulfur hexafluoride; and
      exposing the data storage medium to a plasma comprising sulfur hexafluoride comprises:
         placing the data storage medium in a plasma chamber;
         introducing a sulfur hexafluoride gas into the plasma chamber; and
         exciting the sulfur hexafluoride gas using an RF power source.

2. The method of claim 1 wherein:
   chemically modifying the data storage medium further comprises causing the halogen atomic concentration to be at least approximately 10 percent.

3. The method of claim 1 wherein:
   providing the data storage medium comprises providing a piezoelectric film.

4. The method of claim 3 wherein:
   providing the piezoelectric film comprises providing a film comprising lead zirconium titanate.

5. The method of claim 1 wherein:
   the step of exposing the data storage medium to a plasma comprising sulfur hexafluoride is performed for a period of time lasting between approximately ten seconds and approximately ten minutes.

6. The method of claim 1 wherein:
   the scanning probe has an effective diameter of less than 20 nanometers.

* * * * *